(12) United States Patent
Guillet

(10) Patent No.: US 8,153,323 B2
(45) Date of Patent: Apr. 10, 2012

(54) METHOD FOR USING A FUEL CELL COMPRISING A REGENERATION STEP BY LOWERING THE TEMPERATURE

(75) Inventor: Nicolas Guillet, Chatuzange le Goubet (FR)

(73) Assignee: Commissariat a l'Energie Atomique, Paris (FR)

( * ) Notice: Subject to any disclaimer, the term of this patent is extended or adjusted under 35 U.S.C. 154(b) by 723 days.

(21) Appl. No.: 12/292,322

(22) Filed: Nov. 17, 2008

(65) Prior Publication Data

US 2009/0155643 A1    Jun. 18, 2009

(30) Foreign Application Priority Data

Dec. 18, 2007 (FR) ...................... 07 08829

(51) Int. Cl.
*H01M 8/04* (2006.01)
(52) U.S. Cl. ....................... 429/448; 429/433
(58) Field of Classification Search ............ 429/448, 429/442, 433, 432
See application file for complete search history.

(56) References Cited

U.S. PATENT DOCUMENTS

| | | | |
|---|---|---|---|
| 6,524,733 B1 | 2/2003 | Nonobe | |
| 6,926,979 B2 * | 8/2005 | Cao | 429/424 |
| 7,691,505 B2 * | 4/2010 | Matsubayashi | 429/429 |
| 2005/0069741 A1 * | 3/2005 | Enokizu et al. | 429/26 |
| 2007/0054159 A1 * | 3/2007 | Ryoichi et al. | 429/13 |

FOREIGN PATENT DOCUMENTS

| | | |
|---|---|---|
| DE | 103 28 257 A1 | 1/2005 |
| WO | WO 2007/088471 A1 | 8/2007 |

OTHER PUBLICATIONS

He et al.; "An Electrochemical Method to Improve the Performance of Air Cathodes and Methanol Anodes;" *Electrochemical and Solid-State Letters*; 2002; vol. 5; No. 8; pp. A181-A183.

* cited by examiner

*Primary Examiner* — Hae Moon Hyeon
(74) *Attorney, Agent, or Firm* — Oliff & Berridge, PLC

(57) ABSTRACT

A fuel cell supplies power to a load under nominal conditions. A method for using the fuel cell comprises at least one regeneration step of the performances of the fuel cell by temporarily lowering its temperature below the nominal operating temperature. The regeneration step, performed during a preset time, can be triggered periodically or when the voltage at the terminals of the fuel cell or the fuel cell temperature is lower than a threshold. The performances of the fuel cell, in particular its voltage, can thereby be maintained substantially constant during long periods of use.

7 Claims, 2 Drawing Sheets

METHOD FOR USING A FUEL CELL COMPRISING A REGENERATION STEP BY LOWERING THE TEMPERATURE

BACKGROUND OF THE INVENTION

The invention relates to a method for using a fuel cell, comprising at least one regeneration step of the performances of the cell.

STATE OF THE ART

Fuel cells are electrochemical systems enabling chemical energy to be converted into electricity. For Proton Exchange Membrane Fuel Cells, the chemical energy is in the form of gaseous hydrogen. The fuel cell is then broken down into two compartments (one supplied with hydrogen and the other supplied with oxygen) separated by a proton exchange membrane. At the anode, the protons originating from the oxidation reaction of the hydrogen pass through the membrane whereas the electrons have to pass in an external electric circuit to reach the cathode where the oxygen reduction reaction takes place.

Provided the fuel cell is supplied with hydrogen and oxygen, it is thus possible to obtain an electric current directly proportional to the quantity of gas consumed.

However, in the course of operation, the performances of fuel cells decrease slowly and constantly over several hundred hours. This decrease is about 30 to 150 µV/h for a fixed current over a period for example of 1500 hours. The voltage decrease at the terminals of the fuel cell, illustrated by curve plot A of FIG. 1, is representative of this loss of performance.

This decrease of performances is in particular linked to poor control of the water management in a proton exchange membrane fuel cell.

Indeed, if the membrane dries out, its resistance increases and the performances of the fuel cell will decrease. If a large electric current flows through the membrane, the increased resistance of the membrane leads to heating by Joule effect, which may cause damage to the polymer of the membrane or other components of the fuel cell.

If on the other hand too much water accumulates in the fuel cell, the gasses can no longer reach the active sites that are the seat of the electrochemical reactions. The performances of the fuel cell then decrease accordingly.

The article by He et al., "An Electrochemical Method to Improve the Performance of Air Cathodes and Methanol Anodes", Electrochemical and Solid-State Letters, 5 (8) A181-183(2002), indicates that once the cathodic compartment of the fuel cell has been purged under nitrogen, applying a constant current between the electrodes of the fuel cell enables its performances to be regenerated. With this method, water management is optimized by hydrating the membrane to the maximum and expelling the excess water.

However, although supplying current to the fuel cell or stopping the fuel cell enables high cell performances to be maintained, these options can not be envisaged for industrial applications.

OBJECT OF THE INVENTION

The object of the invention is to provide a method for using the fuel cell that is easy to implement and enables high performances to be maintained throughout the lifetime of the fuel cell.

The method according to the invention is characterized in that the regeneration step comprises lowering of the temperature of the fuel cell below a nominal operating temperature, for a predefined time, a load remaining supplied by the fuel cell during lowering of the temperature.

BRIEF DESCRIPTION OF THE DRAWINGS

Other advantages and features will become more clearly apparent from the following description of a particular embodiment of the invention given for non-restrictive example purposes only and represented in the accompanying drawings, in which.

DESCRIPTION OF A PREFERRED EMBODIMENT OF THE INVENTION

Figure 2:
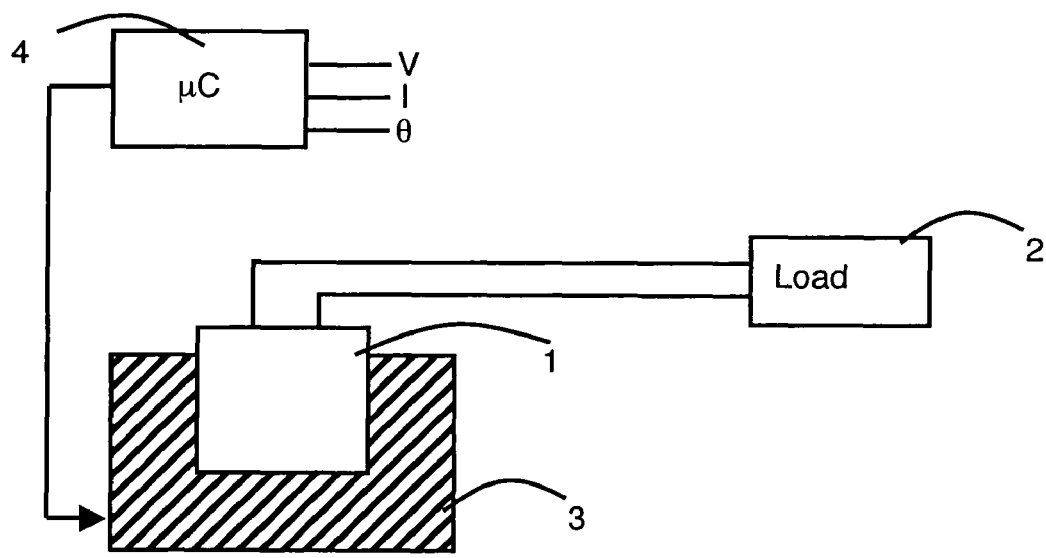
FIG. 2 represents an assembly diagram of a fuel cell, FIG. 3 schematically illustrates the voltage variations at the terminals of the fuel cell according to the method for use according to the invention.

For the fuel cell to keep optimal performances, at least one regeneration step is scheduled during use of the fuel cell 1. This regeneration step consists in temporarily lowering the temperature of fuel cell 1 below the nominal operating temperature. This regeneration step is performed without modifying the other operating parameters of the fuel cell (nominal operating temperature, current density, flow rate, pressure, humidification of the reactive gases . . . ). Furthermore, the use of the fuel cell is not interrupted and supply of power by the fuel cell to an electric load 2 (in FIG. 2) is maintained during the regeneration step. Once the regeneration step has been completed, the temperature of the fuel cell is brought back to its nominal value. For example, as illustrated in FIG. 2, a control circuit 4 is connected to a cooling system 3 of the fuel cell.

Figure 3:
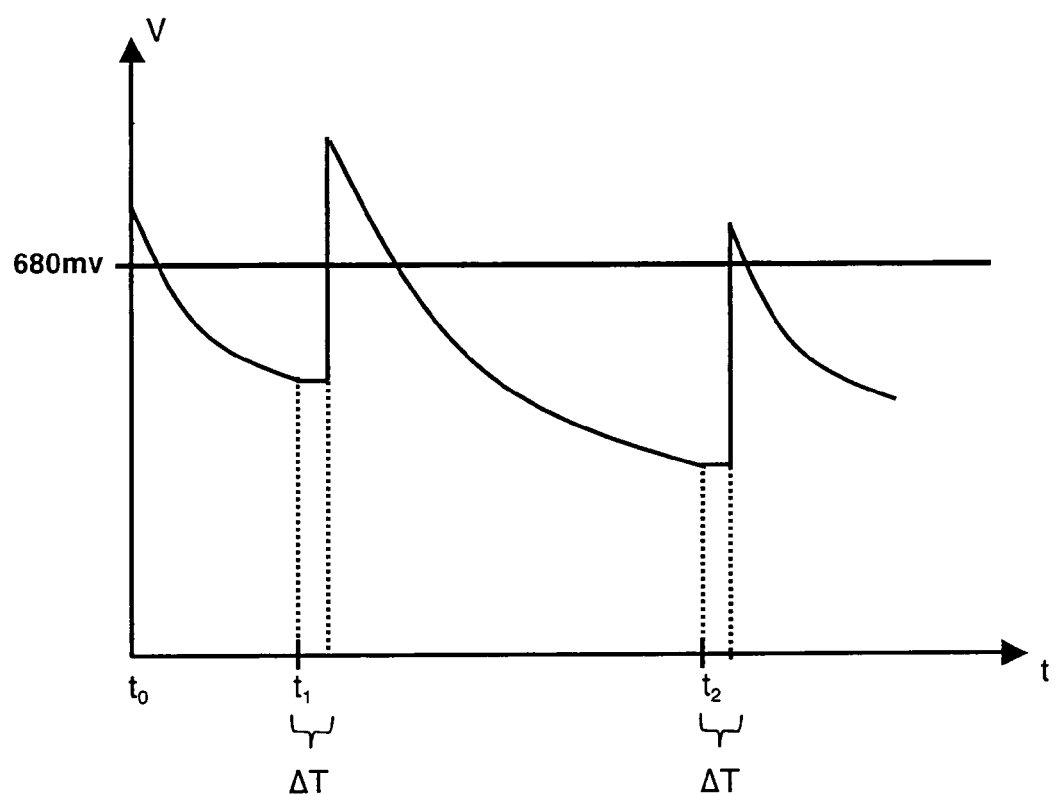

For example, FIG. 3 illustrates the influence on the fuel cell voltage of a regeneration step by temporary cooling of the fuel cell, for example for a period of 4h. From a time $t_0$ and as it is used, the performances of the fuel cell decrease, which leads, at constant current, to a decrease of the voltage at the terminals of fuel cell 1 below its nominal voltage (680 mV) in the example represented. In a schematic manner, the degradation is broken down into a rapid voltage drop followed by a regular decrease according to the operating time. Between times $t_0$ and $t_1$, the nominal operating temperature of the fuel cell is for example 70° C. At a time $t_1$, the control circuit 4 triggers a cooling step of the fuel cell by means of the cooling system 3, for a period $\Delta$ of 4 h. The temperature of fuel cell 1 is decreased below its nominal operating temperature, for example 30° C., at time $t_1$. After this temporary temperature decrease, return to the nominal temperature causes a rapid increase of the voltage at the terminals of fuel cell 1, corresponding to an increase of its performances.

In the example illustrated, between times $t_1$ and $t_2$, the performances of the fuel cell 1 decrease again, to a greater extent than between times $t_0$ and $t_1$. The period between $t_1$ and $t_2$ being greater than that between $t_0$ and $t_1$, the voltage at time $t_2$ is in fact lower than at time $t_1$. At time $t_2$, the temperature of the fuel cell is temporarily lowered, for example to 50° C. This again results in an increase of the voltage at the terminals of the fuel cell above its nominal operating voltage.

Figure 1:
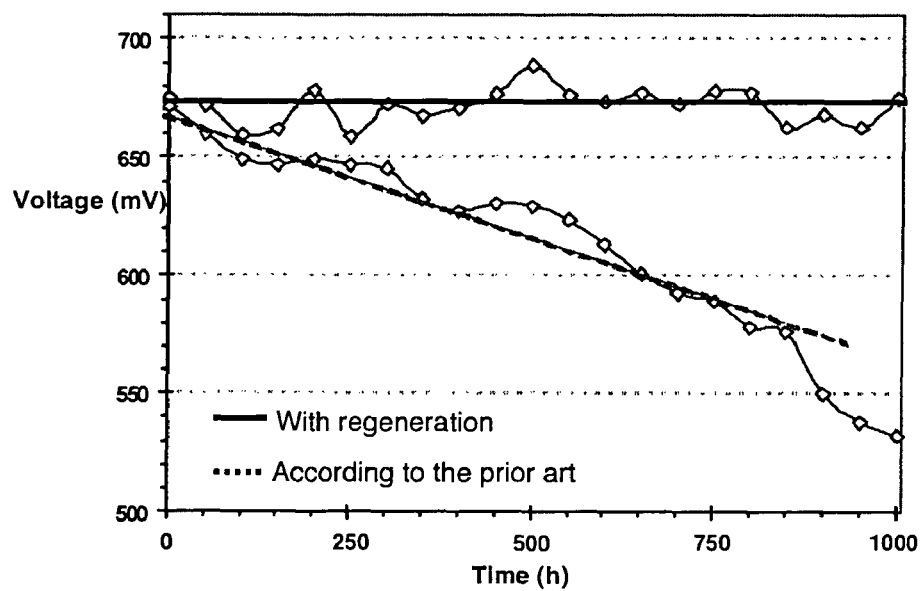
FIG. 1 represents the voltage variations at the terminals of a fuel cell respectively according to the prior art (curve plot A) and according to the invention (curve plot B)

By repeated use of this regeneration step, the voltage at the terminals of the fuel cell can be kept substantially constant over very long periods of use (1000h of operation), as illustrated by curve plot B of FIG. 1.

The regeneration step is advantageously performed periodically, with a period preferably comprised between a few hours and several hundred hours, for example between 20 h and 500 h. However, lowering of the temperature can also be performed when the electric power demanded from the fuel cell decreases, whether it be punctually or periodically. Advantage is thereby taken of a natural decrease of the thermal power produced by the fuel cell to perform an additional lowering of the temperature of the fuel cell at that time, which enables the fuel cell to be regenerated outside the periods of intensive use. It is then possible to trigger lowering of the fuel cell temperature if its operating temperature drops below a certain threshold.

Lowering of the fuel cell temperature can also take place if the performances of fuel cell 1 are measured below a preset threshold, for example if the voltage at the terminals of the fuel cell, significant of a performance drop-off, is lower than a threshold value. The criteria selected for triggering a regeneration step (fixed periodicity, voltage or temperature) are used by control circuit 4 which collects various parameter values characteristic of operation of fuel cell 1 (V, I, temperature . . . ). Control circuit 4 can then for example, according to the temperature of the fuel cell and/or the voltage at the terminals thereof, control operation and more particularly the power of cooling system 3. Control circuit 4 can use other parameters of fuel cell 1 to trigger the regeneration step or to trigger such a step at regular intervals. In this case, control circuit 4 comprises a clock.

The nominal operating temperature of a fuel cell is generally comprised between the ambient temperature and about 120° C. Lowering of the fuel cell temperature is advantageously comprised between 10% and 60% of its nominal operating temperature, expressed in ° C. For example, for a fuel cell having a nominal operating temperature of about 70° C., the regeneration temperature is comprised between 30° C. and 60° C. Although the temperature can be lowered to 20° C, lowering the latter to 50° C. would in practice be sufficient.

The duration of the regeneration step must be sufficiently long for the temperature of the fuel cell to stabilize and be homogeneous, and the duration is therefore variable according to the size of the fuel cell. The regeneration time is preferably comprised between about ten minutes and several hours, for example between ten minutes and twelve hours.

The invention claimed is:

1. A method for using a fuel cell, comprising at least one regeneration step of the performances of the fuel cell, wherein the regeneration step comprises lowering of the temperature of the fuel cell below a nominal operating temperature for a predefined time, an electric load remaining supplied by the fuel cell during lowering of the temperature.

2. The method according to claim 1, wherein lowering of the temperature is comprised between 10% and 60% of its nominal operating temperature in ° C.

3. The method according to claim 1, wherein the regeneration step is repeated periodically.

4. The method according to claim 3, wherein the regeneration step is repeated with a period comprised between a few hours and several hundred hours.

5. The method according to claim 1, wherein the regeneration step is performed when a voltage at fuel cell terminals is lower than a preset threshold.

6. The method according to claim 1, wherein the regeneration step is performed when the temperature of the fuel cell is lower than a preset threshold.

7. The method according to claim 1, wherein the duration of the regeneration step is comprised between 10 minutes and 12 hours.

* * * * *